(12) United States Patent
Seto et al.

(10) Patent No.: US 9,021,885 B2
(45) Date of Patent: May 5, 2015

(54) PRESSURE SENSOR CHIP

(71) Applicant: Azbil Corporation, Tokyo (JP)

(72) Inventors: Yuuki Seto, Tokyo (JP); Tomohisa Tokuda, Tokyo (JP)

(73) Assignee: Azbil Corporation, Tokyo (JP)

( * ) Notice: Subject to any disclaimer, the term of this patent is extended or adjusted under 35 U.S.C. 154(b) by 255 days.

(21) Appl. No.: 13/800,609

(22) Filed: Mar. 13, 2013

(65) Prior Publication Data

US 2013/0239694 A1 Sep. 19, 2013

(30) Foreign Application Priority Data

Mar. 14, 2012 (JP) ................................. 2012-057205

(51) Int. Cl.
*G01L 13/02* (2006.01)
*G01L 9/06* (2006.01)
*G01L 13/06* (2006.01)
*G01L 9/00* (2006.01)

(52) U.S. Cl.
CPC .............. *G01L 13/025* (2013.01); *G01L 13/06* (2013.01); *G01L 9/0092* (2013.01); *G01L 9/0083* (2013.01)

(58) Field of Classification Search
CPC .............. G01L 9/00–9/18; G01L 13/00–13/06
USPC .................................................... 73/700–756
See application file for complete search history.

(56) References Cited

U.S. PATENT DOCUMENTS

| | | | |
|---|---|---|---|
| 4,499,774 A * | 2/1985 | Tsuchiya et al. ................ | 73/727 |
| 5,191,798 A * | 3/1993 | Tabata et al. .................... | 73/727 |
| 5,209,121 A * | 5/1993 | Hafner ........................... | 73/727 |
| 2006/0272422 A1 | 12/2006 | Yoneda et al. | |
| 2007/0089522 A1* | 4/2007 | Kinugasa ....................... | 73/705 |
| 2007/0227254 A1* | 10/2007 | Nagasawa et al. .............. | 73/724 |
| 2008/0314156 A1* | 12/2008 | Kim ................................ | 73/722 |
| 2012/0006129 A1 | 1/2012 | Tokuda et al. | |
| 2013/0233085 A1* | 9/2013 | Mizoguti et al. ................ | 73/716 |

FOREIGN PATENT DOCUMENTS

| | | |
|---|---|---|
| JP | H09-304206 | 11/1997 |
| JP | 3359493 | 12/2002 |
| JP | 2005-69736 A | 3/2005 |
| KR | 10-2012-0004923 | 1/2012 |

OTHER PUBLICATIONS

Korean Office Action dated Apr. 21, 2014, from corresponding Korean Application No. 10-2013-0006978.

* cited by examiner

*Primary Examiner* — Andre Allen
(74) *Attorney, Agent, or Firm* — Troutman Sanders LLP

(57) ABSTRACT

A pressure sensor chip includes a sensor diaphragm that outputs a signal in accordance with a pressure differential, and first and second holding members that face, on peripheral edge portions thereof, one face and another face of a sensor diaphragm, and are in contact therewith. In the peripheral edge portion of the first holding member, in a region that faces the one face of the sensor diaphragm, a region on an outer peripheral side is a region that is bonded to the one face of the sensor diaphragm, and a region on an inner peripheral side is a region that is not bonded to the one face of the sensor diaphragm.

5 Claims, 10 Drawing Sheets

Background Art

Background Art

Background Art

PRESSURE SENSOR CHIP

CROSS REFERENCE TO RELATED APPLICATION

This application claims priority to Japanese Patent Application No. 2012-057205, filed on Mar. 14, 2012, the entire content of which being hereby incorporated herein by reference.

FIELD OF TECHNOLOGY

The present invention relates to a pressure sensor chip that uses a sensor diaphragm that outputs a signal in response to a differential pressure, such as a pressure sensor chip wherein a strain resistance gauge is formed on a thin plate-shaped diaphragm that undergoes dislocation when it bears a pressure, to detect a pressure that is applied to the diaphragm, through a change in the resistance value of the strain resistance gauge that is formed on the diaphragm.

BACKGROUND

Conventionally, commercial differential pressure transmitters have used a differential pressure transmitter that includes a pressure sensor chip that uses a sensor diaphragm that outputs a signal in response to a differential pressure. This differential pressure transmitter is configured so that the pressures that are applied to a high-pressure side and a low-pressure side of a pressure bearing diaphragm are transmitted to the respective sides of the sensor diaphragm through a sealed liquid, as a pressure transmitting medium, where strain on the sensor diaphragm is detected as, for example, a change in a resistance value of a strain resistance gauge, where this change in resistance value is converted into an electric signal that is read out.

Such differential pressure transmitters are used, for example, to measure the height of a fluid surface in, for example, a high temperature reaction tower in an oil refinery by detecting the differential pressure between two locations at different has in a closed tank that stores the fluid that is being measured.

FIG. 8 illustrates schematically a conventional differential pressure transmitter. The differential pressure transmitter 100 is structured with a pressure sensor chip 1 having a sensor diaphragm (not shown) incorporated in a meter body 2. The sensor diaphragm in the pressure sensor chip 1 is made from silicon, glass, or the like, and the strain resistance gauge is formed on the surface of the diaphragm, which is formed as a thin plate. The meter body 2 is made from a main unit portion 3, made out of metal, and a sensor portion 4, where barrier diaphragms (pressure-bearing diaphragms) 5a and 5b, which form a pair of pressure-bearing portions, are provided on the side faces of the main unit portion 3, and the pressure sensor chip 1 is incorporated in the sensor portion 4.

In the meter body 2, between the pressure sensor chip 1 that is incorporated into the sensor portion 4 and the barrier diaphragms 5a and 5b that are provided in the main unit portion 3, pressure transmitting mediums 9a and 9b, such as silicone oil, are sealed into connecting ducts 8a and 8b that connect the pressure sensor chip 1 and the barrier diaphragms 5a and 5b through connecting, respectively, through pressure buffering chambers 7a and 7b that are separated by a large-diameter center diaphragm 6.

Note that the reason why the pressure medium, such as silicone oil, is necessary is because it is necessary to separate the sensor diaphragm, which has the sensitivity to the stress (pressure), from the pressure-bearing diaphragm, which is resistant to corrosion, in order to prevent foreign material within the measurement medium from adhering to the sensor diaphragm and to prevent corrosion of the sensor diaphragm.

In this differential pressure transmitter 100, a first measurement pressure Pa from a process is applied to the barrier diaphragm 5a and a second measurement pressure Pb, from the process, is applied to the barrier diaphragms 5b, as illustrated schematically for the proper operating state in FIG. 9(a). As a result, the barrier diaphragms 5a and 5b dislocate and the pressures Pa and Pb that are applied thereto are conveyed through the pressure transmitting mediums 9a and 9b through the pressure buffering chambers 7a and 7b that are separated by the center diaphragm 6, to the respective sides of the sensor diaphragm of the pressure sensor chip 1. As a result, the sensor diaphragm of the pressure sensor chip 1 undergoes dislocation corresponding to the differential pressure $\Delta P$ between these two transmitted pressures Pa and Pb.

In contrast, when, for example, an excessively large pressure Pover is applied to the barrier diaphragm 5a, the barrier diaphragm 5a undergoes a large dislocation, as illustrated in FIG. 9(b), and thus the center diaphragm 6 undergoes deformation so as to absorb the excessively large pressure Pover. Moreover, when the barrier diaphragm 5a tightly contacts the bottom face (an excessive pressure protecting face) of a recessed portion 10a of the meter body 2 so that that dislocation is constrained, this prevents the transmission of any differential pressure $\Delta P$ in excess of that to the sensor diaphragm through the barrier diaphragm 5a. Similarly, when an excessively large pressure Pover is applied to the barrier diaphragm 5b, then, in the same manner as when an excessively large pressure Pover was applied to the barrier diaphragm 5a, then when the barrier diaphragm 5b tightly contacts the bottom face (the excessive pressure protecting face) of the recessed portion 10b of the meter body 2 so that that dislocation is constrained, this prevents the transmission of any differential pressure $\Delta P$ in excess of that to the sensor diaphragm through the barrier diaphragm 5b. The result is that this prevents breakage of the pressure sensor chip 1 by the application of the excessively large pressure Pover, that is, this prevents in advance breakage of the sensor diaphragm in the pressure sensor chip 1.

In this differential pressure transmitter 100, the pressure sensor chip 1 is enclosed within the meter body 2, thus making it possible to protect the pressure sensor chip 1 from the external corrosive environment, such as the process fluids. However, because the recessed portions 10a and 10b are provided in order to constrain the dislocation of the center diaphragm 6 and the barrier diaphragms 5a and 5b, in a structure to protect the pressure sensor chip 1 from the excessive pressure Pover thereby, the dimensions thereof are unavoidably larger.

Given this, a first stopper member and a second stopper member are provided in the pressure sensor chip, where recessed portions of the first stopper member and the second stopper member face the respective surfaces of the sensor diaphragm to thereby prevent excessive dislocation of the sensor diaphragm when an excessively large pressure is applied, in a structure that has been proposed for preventing breakage/destruction of the sensor diaphragm thereby. See, for example, Japanese Unexamined Patent Application Publication 2005-69736 ("the JP '736").

FIG. 10 illustrates schematically a pressure sensor chip that uses the structure shown in the JP '736. In this figure, 11-1 is a sensor diaphragm, 11-2 and 11-3 are first and second stopper members that are bonded with the sensor diaphragm 11-1 interposed therebetween, and 11-4 and 11-5 are pedestals to which the stopper members 11-2 and 11-3 are bonded. The stopper members 11-2 and 11-3 and the pedestals 11-4 and 11-5 are formed from silicon, glass, or the like.

In the pressure sensor chip 11, recessed portions 11-2a and 11-3a are formed in the stopper members 11-2 and 11-3, where the recessed portion 11-2a of the stopper member 11-2 faces one face of the sensor diaphragm 11-1, and the recessed portion 11-3a of the stopper member 11-3 faces the other face of the sensor diaphragm 11-1. The recessed portions 11-2a and 11-3a have curved surfaces (spherical surfaces), following the dislocation of the sensor diaphragm 11-1, and, at the apexes thereof, pressure guiding holes 11-2b and 11-3b are formed. In the pedestals 11-4 and 11-5 as well, pressure guiding holes 11-4a and 11-5a are formed at positions corresponding to the pressure guiding holes 11-2b and 11-3b of the stopper members 11-2 and 11-3.

When this type of pressure sensor chip 11 is used, when an excessively large pressure is applied to one face of the sensor diaphragm 11-1, causing the sensor diaphragm 11-1 to undergo dislocation, the entirety of the dislocated face is supported and stopped by the curved surface of the recessed portion 11-3a of the stopper member 11-3. Moreover, if an excessively large pressure is applied to the other face of the sensor diaphragm 11-1, causing the sensor diaphragm 11-1 to undergo dislocation, the entirety of the dislocation face is supported and stopped by the curved surface of the recessed portion 11-2a of the stopper member 11-2.

As a result, when an excessively large pressure is applied to the sensor diaphragm 11-1 excessive dislocation is prevented, making it possible to increase the excessive pressure-protected operating pressure (durability) by effectively preventing accidental damage to the sensor diaphragm 11-1 through the application of an excessively large pressure, through making it so that there are no concentrated stresses at the peripheral edge portions of the sensor diaphragm 11-1. Moreover, in the structure illustrated in FIG. 8, it is possible to achieve miniaturization of the meter body 2 through eliminating the center diaphragm 6 and the pressure buffering chambers 7a and 7b and guiding the measurement pressures Pa and Pb directly from the barrier diaphragms 5a and 5b to the sensor diaphragm 11-1.

However, in the structure of the pressure sensor chip 11 illustrated in FIG. 10, the stopper members 11-2 and 11-3 are bonded over the entire surfaces of the peripheral edge portions 11-2c and 11-3c to the respective faces of the sensor diaphragm 11-1. That is, the peripheral edge portion 11-2c of the recessed portion 11-2a of the stopper member 11-2 is caused to face one of the faces of the sensor diaphragm 11-1 and the entire region of the peripheral edge portion 11-2c that is thus facing is bonded directly to the one face of the sensor diaphragm 11-1. In addition, the peripheral edge portion 11-3c that surrounds the recessed portion 11-3a of the stopper member 11-3 is caused to face the other face of the sensor diaphragm 11-1, and the entire region of the peripheral edge portion 11-3c that is thus facing is bonded directly to the other face of the sensor diaphragm 11-1.

In the case of such a structure, when a pressure is applied to one side, causing the sensor diaphragm 11-1 to flex, the neighborhood of the edge of the sensor diaphragm 11-1 (the position surrounded by the dotted line in FIG. 10) on the side on which the pressure is applied, where the greatest tensile stress is produced, is in a state that is constrained on both sides, and thus there is a concentrated stress at this place, and thus there is a problem in that it is not possible to secure the expected durability.

Furthermore, when there is a mismatch, in manufacturing, between the opening sizes of the recessed portions 11-2a and 11-3a of the stopper members 11-2 and 11-3, there will be a positional mismatch in the locations of the constraints on the sensor diaphragm 11-1, and the effect of this may be a remarkable increase in the concentration of stresses. In this case, this combines with any concentration of stresses accompanying any adhesion defect in the sensor diaphragm 11-1, with the risk that this can further reduce durability.

The present invention is to resolve problems such as described above, and an aspect of the present invention is to provide a pressure sensor chip able to secure the expected durability by reducing the stresses produced by the constraints on the sensor diaphragm.

SUMMARY

In such an aspect of the present invention, a pressure sensor chip is provided with a sensor diaphragm that outputs a signal in accordance with a pressure differential, and first and second holding members that face, on the peripheral edge portions thereof, one face and another face of a sensor diaphragm, and are in contact therewith. In the peripheral edge portion of the first holding member, in the region that faces the one face of the sensor diaphragm, a region on the outer peripheral side is a region that is bonded to the one face of the sensor diaphragm, and a region on the inner peripheral side is a region that is not bonded to the one face of the sensor diaphragm.

In this invention, when a high pressure acts on one face of the sensor diaphragm, the sensor diaphragm is able to flex, without producing excessive tensile stresses from the constraint of the first holding member, at the non-bonded region of the peripheral edge portion of the first holding member, thus making it possible to reduce the stresses that are produced at this part.

In the present invention, if the face that bears the measurement pressure on the high-pressure side in the sensor diaphragm is determined with certainty, then one face of the sensor diaphragm is used as the pressure bearing face for the measurement pressure on the high-pressure side and the other face is used as the pressure bearing face for the measurement pressure on the low-pressure side. That is, if the face that will bear the measurement pressure on the high-pressure side in the sensor diaphragm is determined with certainty, then one face of the sensor diaphragm is used as the pressure bearing face for the measurement pressure on the high-pressure side, and the region to the outside of the peripheral edge portion of the first holding member that is bonded to the other face of the sensor diaphragm is used as a bonded region, with the region on the inside as a non-bonded region.

In this invention, the same is true for the peripheral edge portion of the second holding member which, as with the peripheral edge portion of the first holding member, may have, in the region that faces the other face of the sensor diaphragm, the region on the outer peripheral side be a region bonded with the other face of the sensor diaphragm, and the region on the inner peripheral side be a region that is not bonded to the other face of the sensor diaphragm. Doing this makes it possible for the sensor diaphragm to flex without producing excessive tensile stresses due to the constraint of the holding member at the non-bonded region with the outer peripheral side of the holding member on the high-pressure side even when one of the faces of the sensor diaphragm is the pressure bearing face for the measurement pressure on the high-pressure side, thus making it possible to reduce the stress that is produced at that part.

In the present invention, the peripheral edge portion non-bonded region of the first holding member should be a region that is not bonded, and may or may not contact the first face of the sensor diaphragm. For example, the surface may be roughened by plasma or a chemical solution to form a region wherein there is no bonding despite contact with one face of the sensor diaphragm. Moreover, a small step may be formed provided as no more than a specific ratio of the thickness of the sensor diaphragm.

Moreover, in the present invention, the first holding member and second holding member preferably are stopper members provided with recessed portions for preventing excessive dislocation of the sensor diaphragm when an excessively large pressure is applied, but need not necessarily be provided with such recessed portions, but rather may be simple holding members that merely hold the sensor diaphragm.

Given the present invention, of the region of the peripheral edge portion of the first holding member that faces one face of the sensor diaphragm, the region on the outer peripheral side is a region that is bonded to the one face of the sensor diaphragm, and the region on the inner peripheral side is a region that is not bonded to the face of the sensor diaphragm, and thus the stresses that are produced due to the constraints on the sensor diaphragm are reduced, making it possible to secure the expected durability.

DETAILED DESCRIPTION

Examples according to the present invention will be explained below in detail, based on the drawings.

Example

Figure 1:
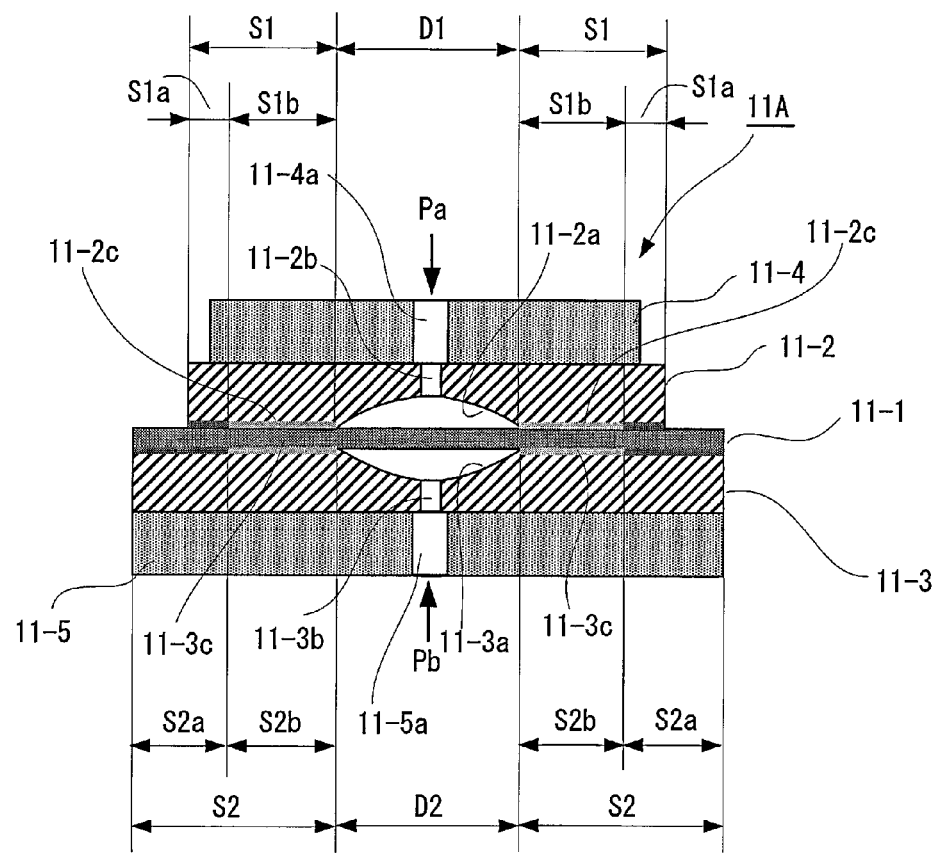
FIG. 1 is a diagram illustrating schematically Example of a pressure sensor chip according to the present invention.
Figure 10:
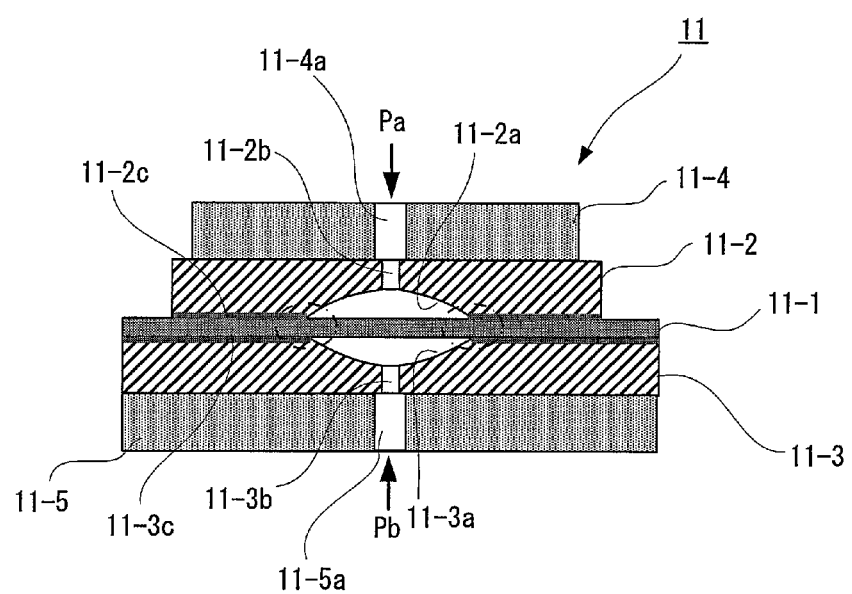
FIG. 10 is a diagram illustrating schematically a sensor chip that uses the structure illustrated in the JP '736.

FIG. 1 is a diagram illustrating schematically Example of a pressure sensor chip according to the present invention. In this figure, codes that are the same as those in FIG. 10 indicate identical or equivalent structural elements as the structural elements explained in reference to FIG. 10, and explanations thereof are omitted. Note that in this Example, the pressure sensor chip is indicated by the code 11A, to differentiate from the pressure sensor chip 11 shown in FIG. 10.

In this pressure sensor chip 11A, in the peripheral edge portion 11-2c of the stopper member 11-2, in a region S1 thereof that faces one face of the sensor diaphragm 11-1, a region S1a on the outer peripheral side is a region that is bonded to the one face of the sensor diaphragm 11-1, and region S1b on the inner peripheral side is a region that is not bonded to the one face of the sensor diaphragm 11-1. Moreover, in the peripheral edge portion 11-3c of the stopper member 11-3, in the region S2 that faces the other face of the sensor diaphragm 11-1, the region S2a on the outer peripheral side is a region that is bonded to the other face of the sensor diaphragm 11-1, and the region S2b on the inner peripheral side is a region that is not bonded to the other face of the sensor diaphragm 11-1.

The region S1a on the outer peripheral side of the peripheral edge portion 11-2c of the stopper member 11-2 is a region that is bonded by being bonded directly to one face of the sensor diaphragm 11-1, and the region S2a on the outer peripheral side of the peripheral edge portion 11-3c of the stopper member 11-3 is a bonded region that is bonded directly to the other face of the sensor diaphragm 11-1. In the below, the region S1a on the outer peripheral side of the peripheral edge portion 11-2c of the stopper member 11-2 shall be termed the "bonded region" S1a, and the region S2a on the outer peripheral side of the peripheral edge portion 11-3c of the stopper member 11-3 shall be termed the "bonded region" S2a.

The region S1b on the inner peripheral side of the peripheral edge portion 11-2c of the stopper member 11-2 is a region that has the surface thereof roughened, through plasma, a chemical solution, or the like, so that even though it contacts the surface on one side of the sensor diaphragm 11-1, it is a non-bonded region that is not bonded thereto. The region S2b on the inner peripheral side of the peripheral edge portion 11-3c of the stopper member 11-3 is also a region having the surface thereof roughened through plasma or a chemical solution so that even though it contacts the other face of the sensor diaphragm 11-1 it is a non-bonded region that is not bonded thereto. In the below, the region S1b on the inner peripheral side of the peripheral edge portion 11-2c of the stopper member 11-2 shall be termed the "non-bonded region" S1b, and the region S2b on the inner peripheral side of the peripheral edge portion 11-3c of the stopper member 11-3 shall be termed the "non-bonded region" S2b.

Additionally, further to the inside from the non-bonded region S1b on the top face of the sensor diaphragm 11-1 is the pressure sensitive region D1 of the diaphragm, and, similarly, further to the inside from the non-bonded region S2b on the bottom face of the sensor diaphragm is the pressure sensitive region D2. One of the measurement pressures Pa is applied to one of the faces that faces the stopper member 11-2 in the pressure sensitive region D1 of the diaphragm, and the other measurement pressure Pb is applied to the face facing the stopper member 11-3 of the pressure sensitive region D2 of the diaphragm. Note that the diameters of the pressure sensitive regions D1 and D2 are equal to the diaphragm effective diameter.

In this pressure sensor chip 11A, if the measurement pressure Pa is the measurement pressure on the high-pressure side and the measurement pressure Pb is the measurement pressure on the low-pressure side, when the measurement pressure Pa of the high-pressure side is applied to the pressure sensitive region D1 on the top face of one side of the sensor diaphragm 11-1, the sensor diaphragm 11-1 is able to flex without producing excessive tensile forces due to the constraints from the stopper member 11-2 at the non-bonded region S1*b* and the peripheral edge portion 11-2*c* of the stopper member 11-2, thus reducing the stress produced at that part.

Moreover, In this pressure sensor chip 11A, if the measurement pressure Pb is the measurement pressure on the high-pressure side and the measurement pressure Pa is the measurement pressure on the low-pressure side, when the measurement pressure Pb of the high-pressure side is applied to the pressure sensitive region D1 on the bottom face of the other side of the sensor diaphragm 11-1, the sensor diaphragm 11-1 is able to flex without producing excessive tensile forces due to the constraints from the stopper member 11-3 at the non-bonded region S2*b* and the peripheral edge portion 11-3*c* of the stopper member 11-3, thus reducing the stress produced at that part.

Figure 2:
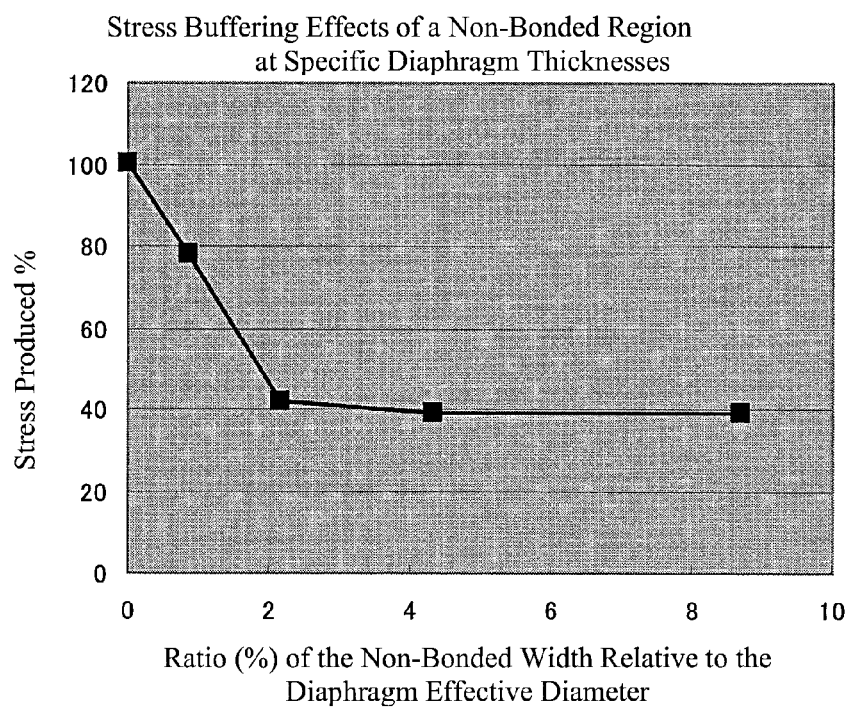
FIG. 2 is a diagram illustrating the relationship between the non-bonded width ratio (%) relative to the diaphragm effective diameter and the stress produced (%) in this pressure sensor chip.

In this pressure sensor chip 11A, the ratio of the non-bonded region S1*b* relative to the diaphragm effective diameter of the pressure sensitive region D1 of a sensor diaphragm 11-1 of a specific thickness, and the ratio of the non-bonded region S2*b* relative to the diaphragm effective diameter of the pressure sensitive region D2 of a sensor diaphragm 11-1 of a specific thickness are determined, from the relationship between the stress produced (%) and the ratio (%) of the non-bonded width relative to the diaphragm effective diameter, shown in FIG. 2, so as to be no less than a specific ratio.

In FIG. 2, the vertical axis is an axis showing the stress produced (%), shown with the stress produced in the conventional structure wherein the non-bonded width is zero (a structure with zero non-bonded region) defined as 100%, and the horizontal axis is an axis showing the ratio (%) of the non-bonded width (the width of the non-bonded region) relative to the diaphragm effective diameter of the pressure sensitive region. The graph shown in FIG. 2 was produced experimentally. From this graph it can be seen that the broader the non-bonded width, the less the stress produced. In this example, when the ratio of the non-bonded width relative to the diaphragm effective diameter of the pressure sensitive region is at least 2%, the amount of stress produced is reduced to 40%. Given this, the ratio of the non-bonded width relative to the diaphragm effective diameter of the pressure sensitive region is established as no less than 2% in the pressure sensor chip 11A illustrated in FIG. 1.

In this way, in the pressure sensor chip 11A in the Example, the stress produced by the constraints on the sensor diaphragm 11-1 is reduced, making it possible to secure the expected pressure durability. Moreover, in this pressure sensor chip 11A, the positional misalignment of the locations of the constraints on the sensor diaphragm 11-1 due to the differences in the opening sizes of the recessed portions 11-2*a* and 11-3*a* of the stopper members 11-2 and 11-3 are eliminated, greatly ameliorating also the increase in stress caused thereby and the stress produced through adhesion defects.

Another Example

Figure 3:
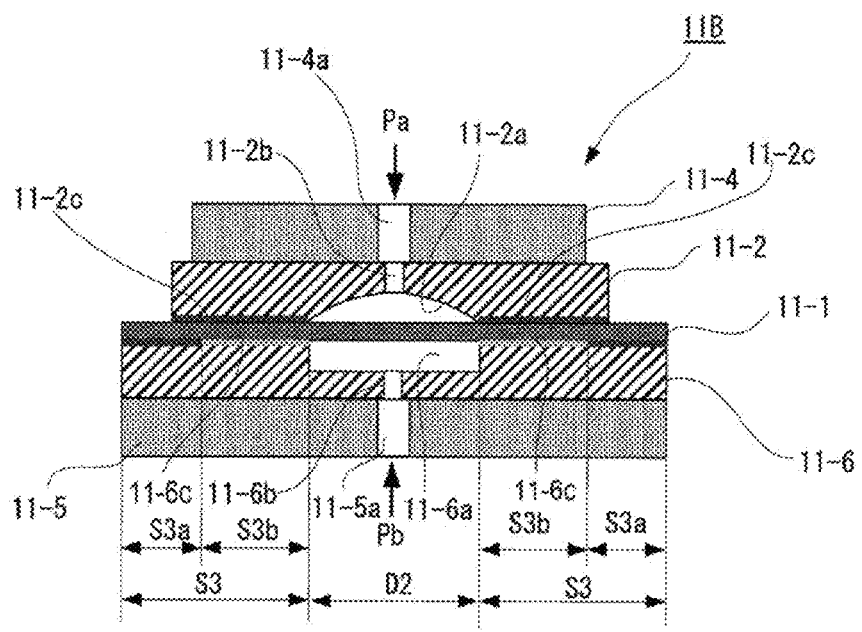
FIG. 3 is a diagram illustrating schematically Another Example of a pressure sensor chip according to the present invention.

In the Example, stopper members are provided on both faces of the sensor diaphragm 11-1, but if the face that will bear the measurement pressure on the high-pressure side of the sensor diaphragm 11-1 is determined with certainty, then the provision of the stopper member may be limited to only the face on the opposite side from the face that bears the measurement pressure on the high-pressure side (that is, the face that bears the measurement pressure on the low-pressure side), and a simple holding member may be provided on the face that bears the measurement pressure on the high-pressure side. Such a structure for a pressure sensor chip is illustrated in FIG. 3 as Another Example.

In the pressure sensor chip 11B, it is determined with certainty that the measurement pressure Pb is the measurement pressure on the high-pressure side, so the stopper member 11-2 is provided on only the one face of the sensor diaphragm 11-1 that will bear the measurement pressure Pa on the low-pressure side, and a simple holding member 11-6 is provided on the other face of the sensor diaphragm 11-1, which bears the measurement pressure Pb on the high-pressure side. That is, while the stopper member 11-2 has a recessed portion 11-2*a* that has a curved surface that follows the dislocation of the sensor diaphragm 11-1, the recessed portion 11-6*a* of the holding member 11-6 does not have such a curved surface, and does not function as a member to guard against an excessively high pressure.

Moreover, in the pressure sensor chip 11B, in contrast to the entire face of the peripheral edge portion 11-2*c* of the stopper member 11-2 being bonded directly to one face of the sensor diaphragm 11-1, in the peripheral edge portion 11-6*c* of the holding member 11-6, of the region S3 that faces the other face of the sensor diaphragm 11-1, the region S3*a* on the outer peripheral side is a region that is bonded to the other face of the sensor diaphragm 11-1, and the region S3*b* on the inner peripheral side is a region that is not bonded to the other face of the sensor diaphragm 11-1.

In this pressure sensor chip 11B it is determined with certainty that the measurement pressure Pb is the measurement pressure on the high-pressure side, and thus the sensor diaphragm 11-1 only flexes to the side of the recessed portion 11-2*a* of the stopper member 11-2. In this case, it is possible for the sensor diaphragm 11-1 to flex without producing excessive tensile stress caused by the constraints from the holding member 11-6 because of the non-bonded region S3*b* that is not bonded to the peripheral edge portion 11-6*c* of the holding member 11-6, thus making it possible to reduce the stress that is produced at this part.

Yet Another Example

Figure 4:
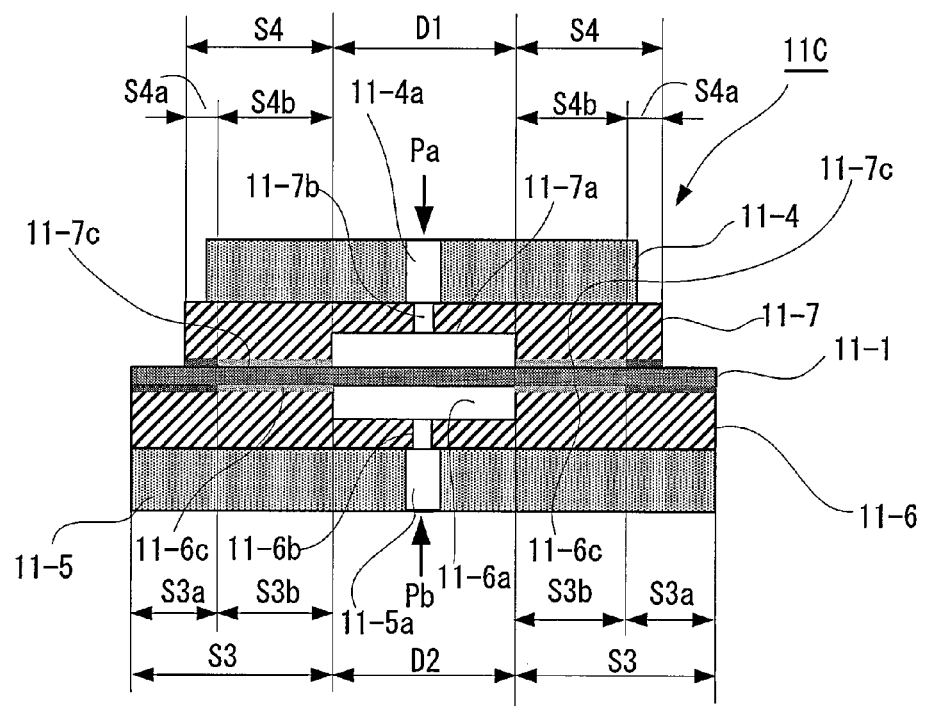
FIG. 4 is a diagram illustrating schematically Yet Another Example of a pressure sensor chip according to the present invention.

While in the Example, stopper members were provided on both faces of the sensor diaphragm 11-1, the excessive pressure protecting function may be eliminated for both sides of the sensor diaphragm 11-1, and a simple holding member may be provided on each side of the sensor diaphragm 11-1. Such a structure for a pressure sensor chip is illustrated in FIG. 4 as Yet Another Example.

In this pressure sensor chip 11C, a holding member 11-7 is provided on one side of the sensor diaphragm 11-1, and a holding member 11-6 is provided on the other face of the sensor diaphragm 11-1. That is, the recessed portions 11-6*a* and 11-7*a* of the holding members 11-6 and 11-7 do not have curved surfaces that follow the dislocation of the sensor diaphragm 11-1, and do not function as members for protecting against excessive pressure.

Moreover, in the pressure sensor chip 11C, in the peripheral edge portion 11-6*c* of the holding member 11-6, of the region S3 that faces the other face of the sensor diaphragm 11-1, the region S3*a* on the outer peripheral side is a region that is bonded to the other face of the sensor diaphragm 11-1, and the region S3*b* on the inner peripheral side is a region that is not bonded to the other face of the sensor diaphragm 11-1. Moreover, in the peripheral edge portion 11-7*c* of the holding member 11-7, in the region S4 that faces the one face of the sensor diaphragm 11-1, the region S4*a* on the outer peripheral side is a region that is bonded to the one face of the sensor diaphragm 11-1, and the region S4*b* on the inner peripheral side is a region that is not bonded to the one face of the sensor diaphragm 11-1.

In this pressure sensor chip 11C, if the measurement pressure Pa is the measurement pressure on the high-pressure side and the measurement pressure Pb is the measurement pressure on the low-pressure side, then when the measurement pressure Pa on the high-pressure side is applied to the one face of the sensor diaphragm 11-1, the sensor diaphragm 11-1 is able to flex without producing excessive tensile stress caused by the constraints from the holding member 11-6, due to the non-bonded region S4*b* that is not bonded to the peripheral edge portion 11-6*c* of the holding member 11-6, thus making it possible to reduce the stress that is produced at this part.

Moreover, in this pressure sensor chip 11C, if the measurement pressure Pb is the measurement pressure on the high-pressure side and the measurement pressure Pa is the measurement pressure on the low-pressure side, then when the measurement pressure Pb on the high-pressure side is applied to the other face of the sensor diaphragm 11-1, the sensor diaphragm 11-1 is able to flex without producing excessive tensile stress caused by the constraints from the holding member 11-6, due to the non-bonded region S3*b* that is not bonded to the peripheral edge portion 11-6*c* of the holding member 11-6, thus making it possible to reduce the stress that is produced at this part.

Further Example

Figure 5:
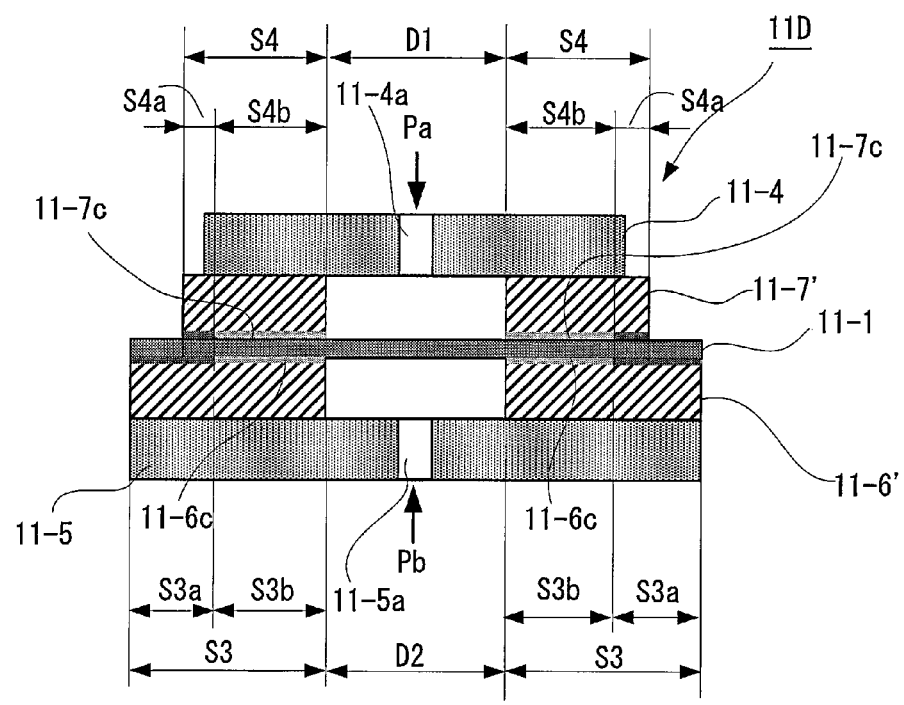
FIG. 5 is a diagram illustrating schematically Further Example of a pressure sensor chip according to the present invention.

While in the Yet Another Example recessed portions 11-6*a* and 11-7*a* were provided in the holding members 11-6 and 11-7, the recessed portions 11-6*a* and 11-7*a* need not necessarily be provided. FIG. 5 shows a structure of a pressure sensor chip 11D, as Further Example, that uses holding members 11-6' and 11-7', wherein the recessed portions 11-6*a* and 11-7*a* have been omitted.

Another Further Example

While in the Example the non-bonded region S1*b* of the peripheral edge portion 11-2*c* of the stopper member 11-2 and the non-bonded region S2*b* of the peripheral edge portion 11-3*c* of the stopper member 11-3 were formed through, for example, roughening the surface through plasma, a chemical solution, or the like, instead a small step may be formed established as no more than a specific ratio of the thickness of the sensor diaphragm 11-1. Such a structure for a pressure sensor chip is illustrated in FIG. 6 as Another Further Example.

Figure 6:
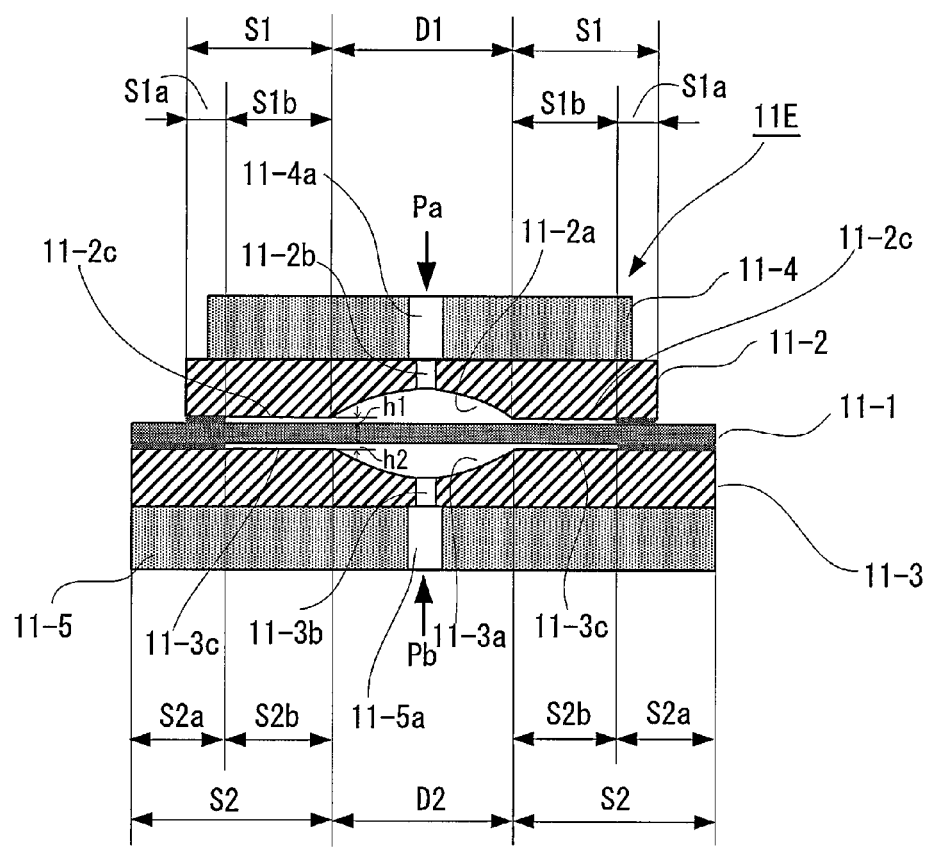
FIG. 6 is a diagram illustrating schematically Another Further Example of a pressure sensor chip according to the present invention.

In the pressure sensor chip 11E illustrated in FIG. 6, the non-bonded region S1*b* of the peripheral edge portion 11-2*c* of the stopper member 11-2 is made into a step h1, to be a region that does not contact the one face of the sensor diaphragm 11-1. Moreover, the non-bonded region S2*b* of the peripheral edge portion 11-3*c* of the stopper member 11-3 is made into a step h2, to be a region that does not contact the other face of the sensor diaphragm 11-1.

Figure 7:
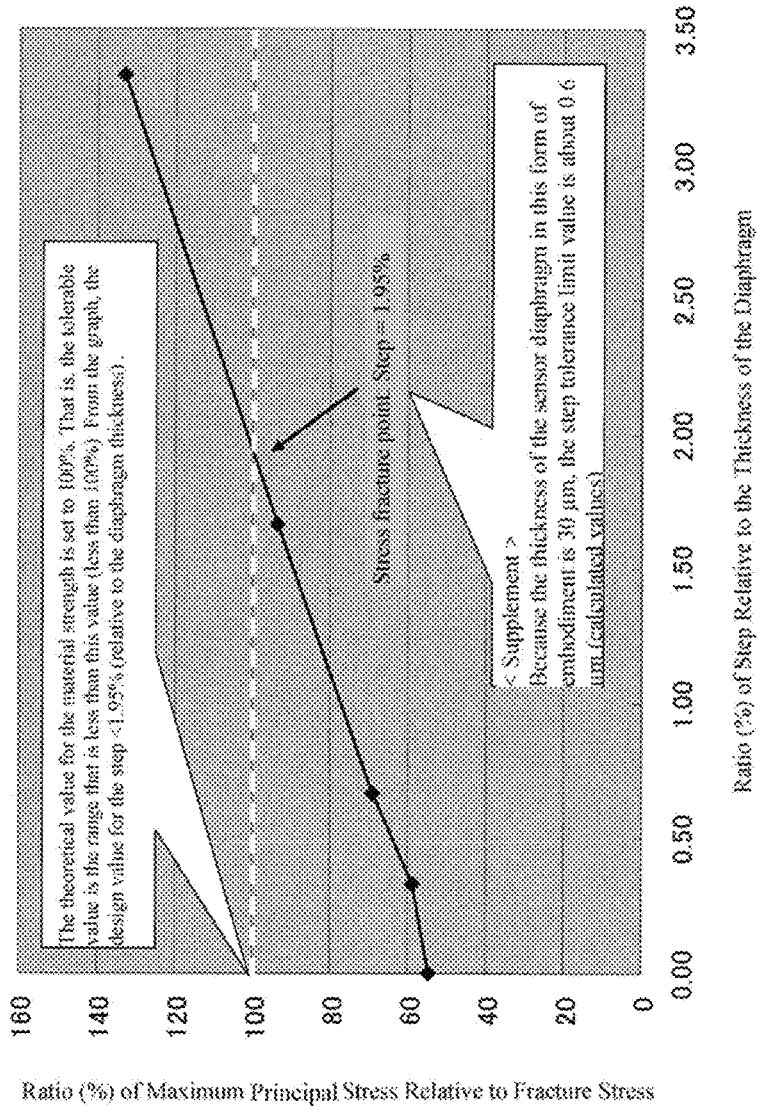
FIG. 7 is a diagram showing the relationship between the ratio (%) of the step relative to the thickness of the diaphragm in the peripheral edge portion of the stopper member and the ratio (%) of the maximum principal stress relative to the fracture stress in the Another Further Example.
Figure 8:
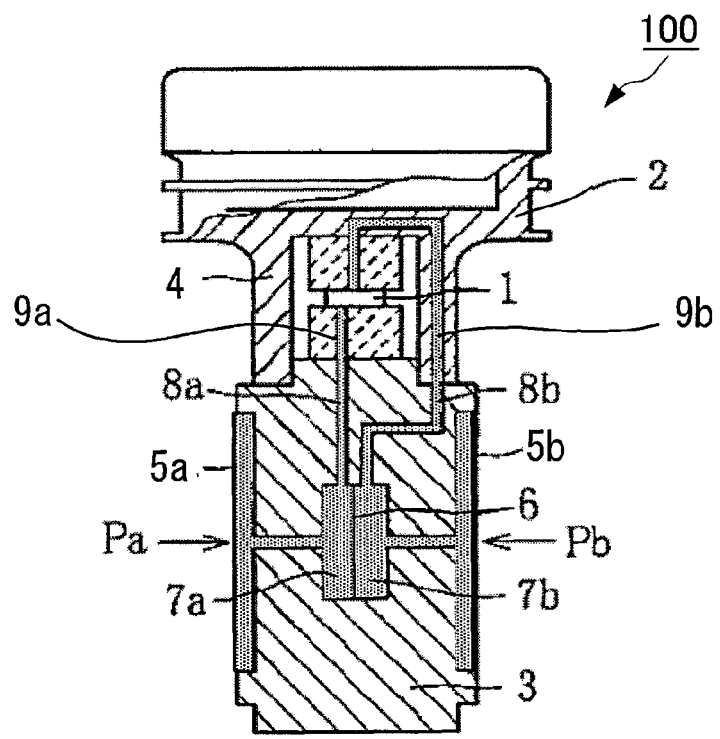
FIG. 8 is a diagram illustrating a schematic structure for a conventional differential pressure transmitter.
Figure 9:
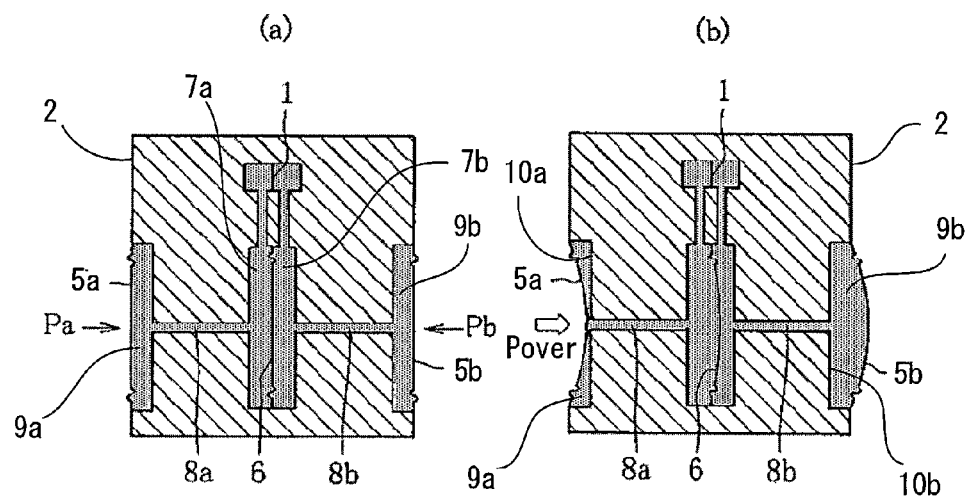
FIG. 9 is a diagram illustrating schematically the operating state of this differential pressure transmitter.

The steps h1 and h2 that form the non-bonded regions S1*b* and S2*b* of the peripheral edge portions 11-2*c* and 11-3*c* of the stopper members 11-2 and 11-3 are established as small steps of no more than a specific ratio of the thickness of the sensor diaphragm 11-1, from the relationship between the ratio (%) of the step relative to the diaphragm thickness and the ratio (%) of the maximum principal stress relative to the fracture stress, illustrated in FIG. 7.

In FIG. 7, the vertical axis is the axis showing the ratio (%) of the maximum principal stress relative to the fracture stress, where the theoretical value for the material strength is set to 100%. The horizontal axis is an axis showing the ratio (%) of the step relative to the diaphragm thickness. The graph shown in FIG. 7 was produced experimentally. From this graph it can be understood that the larger the ratio of the step relative to the thickness of the diaphragm, the greater the ratio of the maximum principal stress relative to the fracture stress. In this example, if the ratio of the step is 1.95% of the thickness of the diaphragm, then the ratio of the maximum principal stress relative to the fracture stress is 100%. Given this, in the Another Further Example the ratio of the step relative to the diaphragm thickness is set to less than 1.95%. For example, if the thickness of the sensor diaphragm 11-1 is 30 µm, then the tolerance limit value on the steps h1 and h2 will be about 0.6 µm (a calculated value).

Note that while in the examples set forth above the sensor diaphragm 11-1 was of a type wherein a strain resistance gauge was formed wherein the resistance value changes in response to a change in pressure, the sensor chip may instead be of an electrostatic capacitance type. A sensor chip of an electrostatic capacitance type is provided with a substrate that is provided with a specific space (a capacitance chamber), a diaphragm that is provided over the space in the substrate, a stationary electrode that is formed on the substrate, and a movable electrode that is formed on the diaphragm. When the diaphragm bears pressure and is deformed, the spacing between the movable electrode and the stationary electrode changes, changing the electrostatic capacitance therebetween.

Extended Examples

While the present invention has been explained above in reference to the examples, the present invention is not limited to the examples set forth above. The structures and details in the present invention may be varied in a variety of ways, as can be understood by one skilled in the art, within the scope of technology in the present invention. Moreover, the present invention may be embodied through combining the various examples, insofar as there are no contradictions.

The invention claimed is:

1. A pressure sensor chip comprising:
    a sensor diaphragm that outputs a signal in accordance with a pressure differential; and
    first and second holding members that face, on peripheral edge portions thereof, one face and another face of a sensor diaphragm, and are in contact therewith, wherein,
    in the peripheral edge portion of the first holding member, in a region that faces the one face of the sensor diaphragm,
    a region on an outer peripheral side is a region that is bonded to the one face of the sensor diaphragm, and
    a region on an inner peripheral side is a region that is not bonded to the one face of the sensor diaphragm.

2. The pressure sensor chip as set forth in claim 1, wherein, in the sensor diaphragm,
    the one face is a pressure bearing face for a measurement pressure of a high-pressure side, and
    the other face is a pressure bearing face for a measurement pressure of a low-pressure side.

3. The pressure sensor chip as set forth in claim 1, wherein, in the peripheral edge portion of the second holding member, in a region that faces the other face of the sensor diaphragm,
    a region on an outer peripheral side is a region that is bonded to the other face of the sensor diaphragm, and a region on an inner peripheral side is a region that is not bonded to the other face of the sensor diaphragm.

4. The pressure sensor chip as set forth in claim 1, wherein the non-bonded region of the peripheral edge portion of the first holding member is a small step established at no more than a specific ratio of a sensor diaphragm thickness.

5. The pressure sensor chip as set forth in claim 1, wherein either the first holding member or the second holding member is provided with a recessed portion to stop excessive dislocation of the sensor diaphragm when an excessively large pressure is applied to the sensor diaphragm.

* * * * *